United States Patent [19]

Lind, Jr.

[11] 4,066,096
[45] Jan. 3, 1978

[54] FLOW-CONTROL VALVE

[75] Inventor: Charles F. Lind, Jr., Los Angeles, Calif.

[73] Assignee: Aqueduct, Inc., Santa Ana, Calif.

[21] Appl. No.: 723,570

[22] Filed: Sept. 15, 1976

Related U.S. Application Data

[63] Continuation-in-part of Ser. No. 598,949, July 25, 1975, abandoned.

[51] Int. Cl.² ............................................. G05D 7/01
[52] U.S. Cl. ................................................ 137/504
[58] Field of Search ...................... 137/501, 503, 504; 138/46

[56] References Cited

U.S. PATENT DOCUMENTS

| | | | |
|---|---|---|---|
| 2,845,087 | 7/1958 | Thomas | 137/504 |
| 3,130,747 | 4/1964 | Benaway | 137/504 |
| 3,319,648 | 5/1967 | Donner | 137/504 |
| 3,339,580 | 9/1967 | Cutler et al. | 137/504 |
| 3,424,196 | 1/1969 | Donner | 137/504 |
| 3,854,497 | 12/1974 | Rosenberg | 137/504 X |

Primary Examiner—Robert G. Nilson
Attorney, Agent, or Firm—Bruce L. Birchard

[57] ABSTRACT

An improved hydraulic flow-control valve with critical dimensional characteristics which assure laminar flow rather than turbulent flow through the valve thus reducing or eliminating valve "hunting" or chattering and increasing sensitivity of the valve to pressure changes and assuring accurate and totally predictable fluid flow control over a wide range of differential pressures across the valve.

6 Claims, 8 Drawing Figures

FLOW-CONTROL VALVE

RELEVANT CO-PENDING APPLICATION

This is a continuation-in-part of my co-pending application Ser. No. 598,949, now abandoned.

BACKGROUND OF THE INVENTION

1. Field of the Invention

This invention relates to fluid flow-control valves and, more particularly, automatic flow-control valves for hydronic systems.

2. Description of the Prior Art

The prior art is replete with flow-control valves of various degrees of sophistication, from manual valves to automatic valves utilizing spring-loaded pistons responding to pressure variations to open or close exit ports and thus to control fluid flow. All of the automatic flow-control valves of the prior art have suffered from turbulent fluid flow therethrough. Such turbulent flow has resulted in hunting or chattering of the flow control piston, which is a noisy and destructive phenomenon, and has further, made it necessary to use a plurality of different valves to cover a wide range of differential pressures across the control valves. The problem has been particularly evident at low differential pressures.

Accordingly, it is a general object of this invention to overcome the disadvantages of the prior art, as described hereinbefore.

It is a more specific object of this invention to provide a flow-control valve which provides accurate flow control over a wide range of operating pressures, as represented by a wide range of differential pressures across such control valve.

SUMMARY OF THE INVENTION

In brief, by holding valve dimensions to certain critical values, turbulent fluid flow through the valve can be avoided. Specifically, a critical relationship has been found between cross-sectional areas of the pipeline opening, the piston and the regulator exit port areas; and the free and fullycompressed lengths of the piston biasing spring. If the critical criteria, defined in more detail hereinafter, are met, laminar, rather than turbulent, flow through the valve occurs and the desired performance characteritics are achieved.

BRIEF DESCRIPTION OF THE DRAWINGS

A better understanding of my invention may be had from a consideration of the following detailed description, taken in conjunction with the accompanying drawings, in which:

FIG. 5 is an isometric view of a spring designed to cooperate with the piston of FIG. 2 to achieve the results of this invention;

DESCRIPTION OF THE PREFERRED EMBODIMENT

Figure 1:
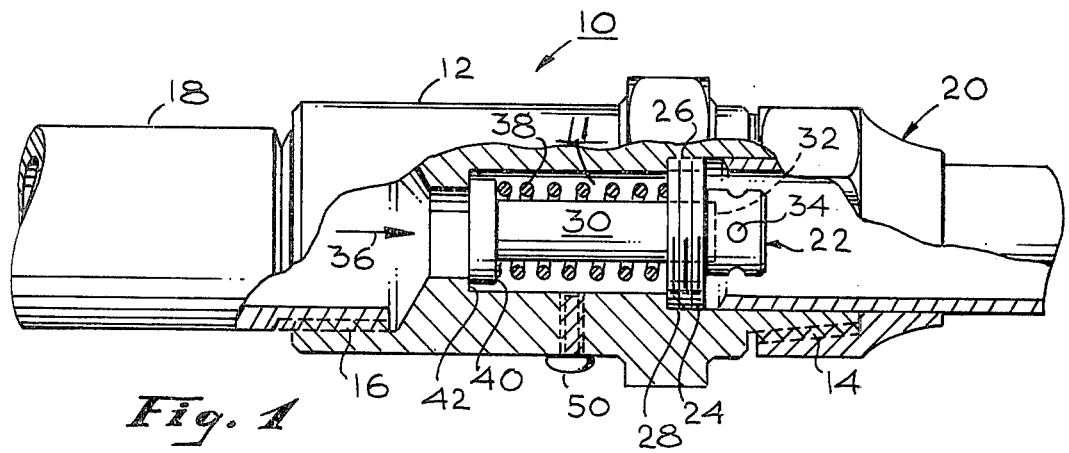
FIG. 1 is an assembly drawing, partially cut away, showing the flow-control valve according to this invention installed in a pipe through which a flow of fluid to be controlled is intended.

In FIG. 1, valve 10 includes body 12 having male connecting threads 14 at one end and female connecting threads 16 at the other end to permit insertion of valve 10 between upstream pipeline 18 and downstream member 20, which may be a faucet or shower head in an open system, or a pipeline through a utilization device, such as a fan-coil unit, is a closed fluid system.

Figure 2:
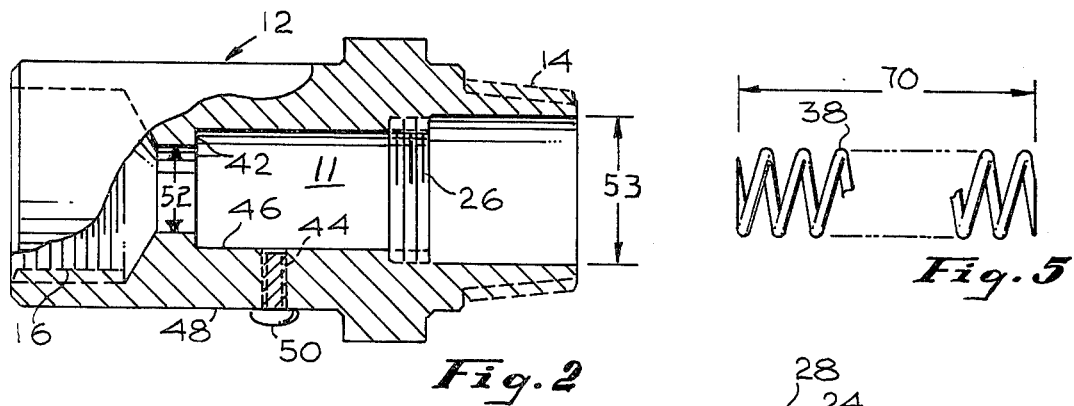
FIG. 2 is a detailed view, partially cut away, of a portion of the control valve of FIG. 1.
Figure 4:
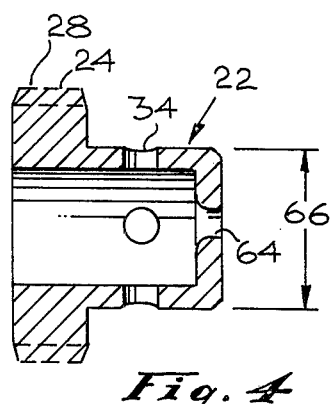
FIG. 4 is a cross-sectional view of a regulator element designed to cooperate with piston element of FIG. 2.

Regulator 22 is secured within chamber portion 11 of body 12 by means of cooperating threads 24 and 26 on regulator 22 and within body 12, respectively, as can be seen more clearly by reference to FIGS. 2 and 4. It should be understood that regulator 22 may be secured within body 12 by other than cooperating male and female threads. For example, retaining rings snapped into cooperating grooves in the inner walls of body 12 before and after portion 28 of regulator 22 (shown threaded in FIG. 1 and 4) will secure regulator 22 fixedly within body 12.

Piston 30 has its end 32 nesting snugly within regulator 22 for movement along the axis of regulator 22 into an interfering position with respect to side ports 34 of regulator 22 in response to fluid flow in direction 36. A spring 38 resists such movement of piston 30.

Movement of end 32 of piston 30 out of regulator 22 when the valve 10 is operating is prevented by flange 40 of piston 30 engaging shoulder 42 of chamber 11 in body 12 when the fluid pressure in the direction 36 is reduced below a predetermined level, usually corresponding to 12 p.s.i. differential pressure across valve 10.

Pressure tap-hole 44 is provided between the inner wall 46 and the outer wall 48 of body 12.

Some of the details of the body 12 of FIG. 1 can be seen more clearly in FIG. 2. The same designations have been applied to the elements which are common to FIGS. 1 and 2. The internal diameter 52 (FIG. 2), which may be the same as the internal diameter of the main pipeline 18 in the system being controlled by valve 10, is one of the significant dimensional factors in determining certain other critical diameters in the flow-control valve. More specifically, the cross-sectional areas must have the relationship set forth hereinafter in order to approach the optimum performance achieved by this invention. Of course, those areas are proportional to the squares of the various diameters which will be discussed hereinafter. The use of diameters in the description of the drawings simplifies the presentation, herein. Diameter 53 may be equal to the inner diameter of pipeline 18 or may be different therefrom, as here where the utilization device 20 requires a diameter reduction.

Figure 3:
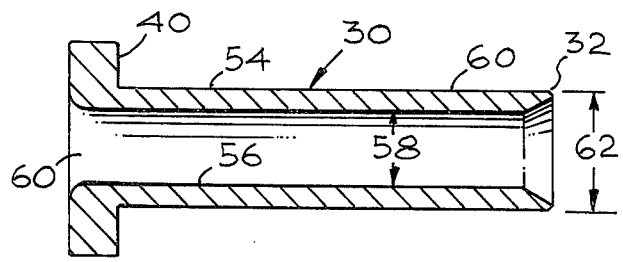
FIG. 3 is a cross-sectional view of a piston element usable in the embodiment of FIG. 1.

In FIG. 3, piston 30 has a cylindrical body portion 54. The body portion 54 has an inner cylindrial surface 56 with a diameter 58 and an outer cylindrical surface 60 with a diameter 62. Flange 40 has a bell-shaped inlet aperture 60. The shape of the curve is arcuate to provide a smooth-flow transition into piston 30 and thus reduce turbulents with their associated valve chattering or hunting. Of course, the centerline of piston 30 lies along the centerline of body 12, in operation. The outlet end 32 of piston 30 has an internal taper as shown in FIG. 3.

In FIG. 4, again, parts given designations in earlier figures carry the same designations here. In addition to side ports 34, regulator 22 has end port 64, which may be bellshaped (particularly on its upstream surface) to assure laminar flow of the fluid being handled. The centerline of regulator 22 lies along the centerline of body 12. The outer diameter 66 of regulator 22 is another critical factor in achieving the desired laminar flow through valve 10.

Assigning the designation "A" to the cross-sectional area corresponding to diameter 52 (which may also be the inner diameter of pipeline 18), "B" to the cross-sectional area corresponding to diameter 62 (piston outer diameter), "C" to the cross-sectional area corresponding to diameter 58 (piston inner diameter) and "D" to the cross-sectonal area corresponding to diameter 66 (regulator outer diameter), the critical relationship of these areas in order to achieve the laminar flow sought and achieved by this invention in the relatively high differential pressure case (12 PSIG and greater) and utilizing the valve of FIGS. 1 – 5 is set forth in the following equations;

$$A = 2B, \text{ and}$$

$$C = A - D$$

Spring 38 may be external to or internal to piston 30. The function of spring 38 is, of course, to provide the restoring force for piston 30 in this embodiment.

Figure 6:
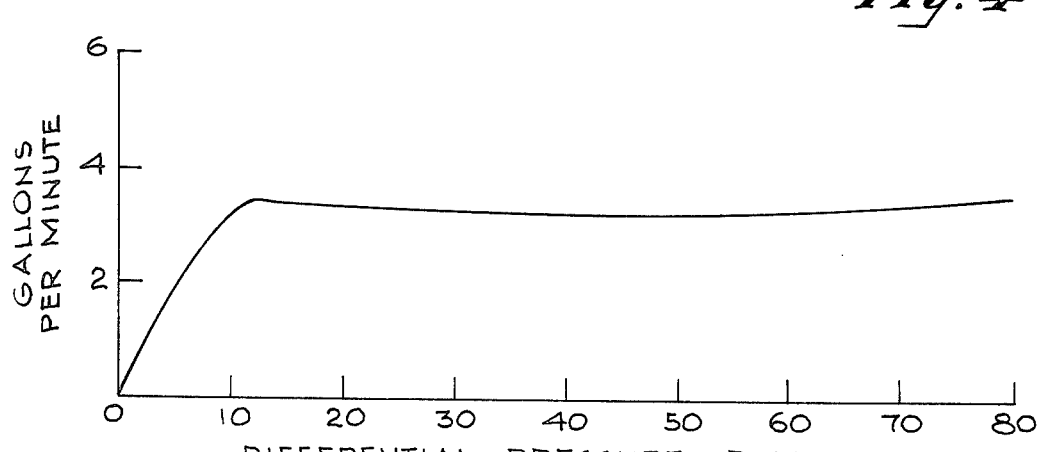
FIG. 6 is a performance curve of a flow-control valve incorporating the features of this invention.

In FIG. 6 the relationship of fluid flow in gallons per minute through valve 10, to the differential pressure acoss valve 10 for the high-differential-pressure embodiment of FIGS. 1 – 5 is shown. It is clear that a valve according to this invention achieves a high degree of fluid flow control. In the curve of FIG. 6 the rate of fluid flow varies only 5% over a differential pressure range of 80 PSIG. Experiments recently have extended this range to approxomately 100 PSIG.

The valve described in connection with FIGS. 1 – 6, has great merit in applications where pressure differentials of 12 PSIG or more can be tolerated, but commercial requirements are rapidly shifting to control valves which will control fluid flow accurately over a broad range of pressure differentials, starting at pressure differential of 1 – 5 PSIG. To achieve such an end the embodiment of FIG. 7 must be utilized.

Figure 7:
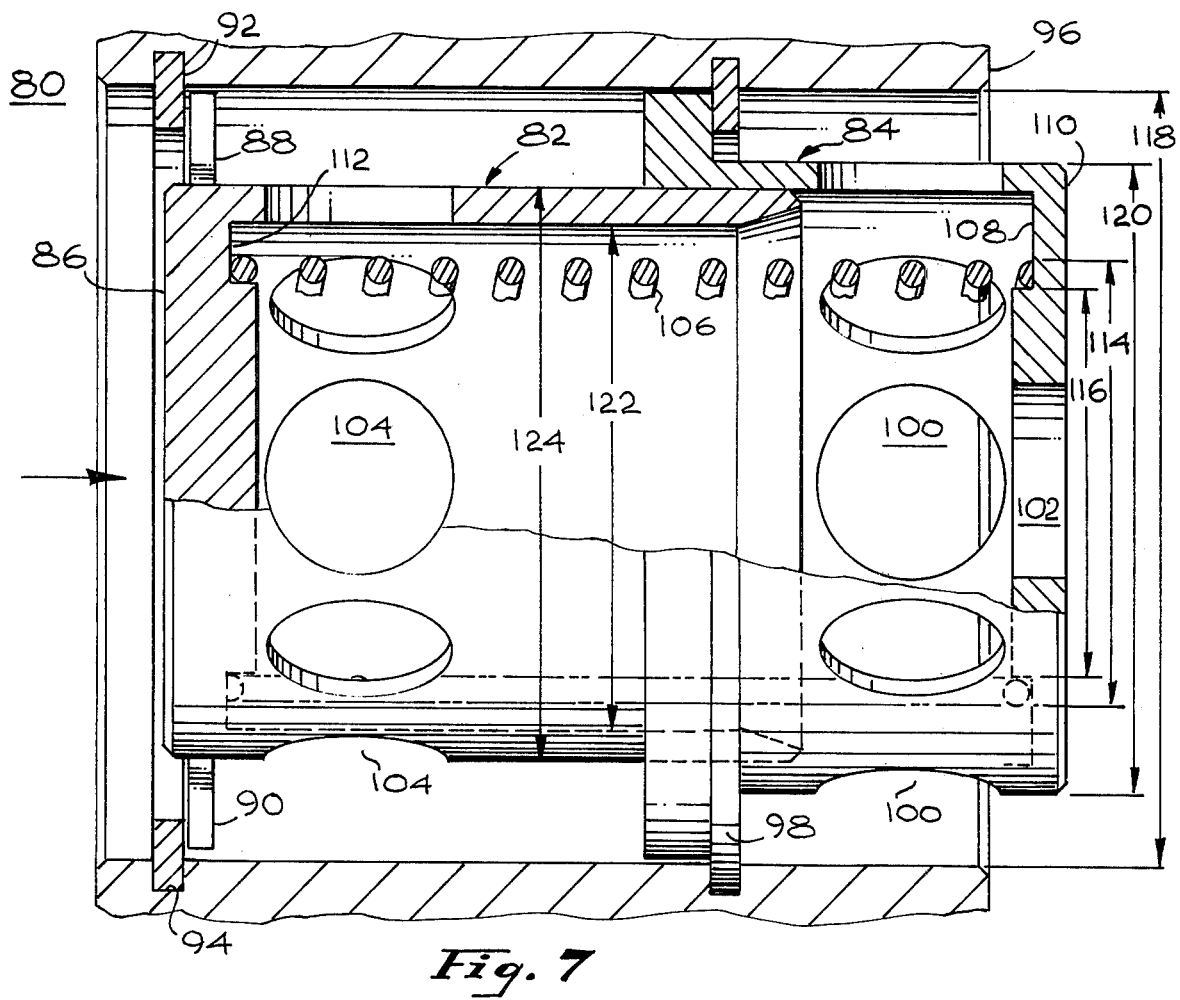
FIG. 7 is a partially-sectioned view of a second embodiment of a flow-control valve according to the present invention.

In FIG. 7, flow-control valve 80 has piston portion 82 slidably supported in regulator portion 84. Piston 82 has its upstream end 86 closed, in contrast to the open upstream end of piston 30 in FIG. 3. Diametrically opposed projections 88 and 90, with retaining ring 92, restrict the upstream motion of piston 82. Regulator portion 84 is held in position in pipe 96 by securing means such as ring 98. Regulator 84 has a series of side exit pots 100 and an end exit port 102.

End exit port 102 is more than a mere relief aperture. It has a critical diameter and a critical part to play in assuring the flow-control performance achieved by this invention. Specifically, the diameter of the end exit port should be equal to that of any one of the side exit ports, those all having equal diameters.

Piston 82 is provided with entrance ports 104. Optimum performance has been achieved in a valve having 8 entrance ports, 8 side regulator ports and the single, squareedged end exit port, the total area of the entrane ports being equal to the total area of the regulator's side and end exit ports.

The return of piston 82 to its ultimate upstream position is caused by a combination of the negative pressure on end 86 when fluid flows through entrance ports 104 and return pressure produced by spring 106 resting, at one end, on the inner face 108 of regulator end-cap 110 and at the other end on the inner face 112 of piston end cap 86.

Spring 106 does more than provide a restoring force, however, based on experimental results to date. It appears that the inter-coil spacing within the spring cooperates with the piston adjusted exit port area to restrict fluid flow through the valve. Therefore, to achieve the optimum control available from my invention, the external diameter 114 of spring 106 should be approximately 58% of internal diameter 118 of pipe or casing 96, and the internal diameter 116 of spring 106 should be approximately 50% of diameter 118. Experimental results have shown that, for optimum conditions, diameter 114 should be 58.7% of diameter 118 and diameter 116 should be 50.7% of diameter 118. In the experiments spring 106 of stainless steel, had 12½ coils, and had closed and ground ends. The free length of compression spring 106 should be 140% of pipeline inner diameter 118 and its solid (fully compressed) length should be 46.3% of diameter 118.

As in the embodiment of FIGS. 1 – 6, a critical relationship has been shown to exist between the pipe or housing inner diameter 118 and regulator outer diameter 120. Specifically, diameter 120 should be approximately 74% of diameter 118. Similarly, piston inner diameter 122 should be approximately 67% of diameter 118 and piston outer diameter 124 should be 71% of diameter 118, approximately.

Assuming a thin-walled piston and regulator, the dimensions which must be held to the closest tolerances with respect to the casing or pipe inside diameter 118 to achieve the total performance predictability and broad-ranged control taught by this invention are the piston inside diameter 122, spring outside diameter 114, spring inside diameter 116, spring free length and spring solid length.

The valve according to this invention provides 27 gallons per minute per square inch of port area.

Figure 8:
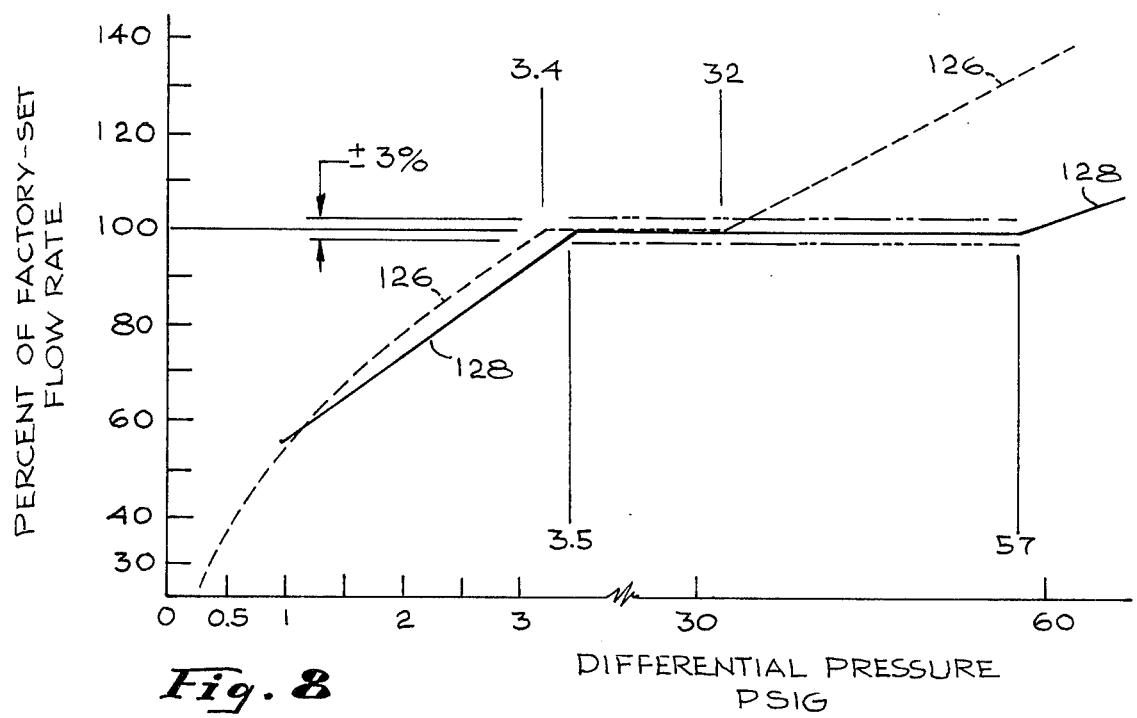
FIG. 8 is a comparative control chart for the valve of this invention and one from the prior art.

The results in flow control arising from utilizing the teachings of my invention are shown clearly in FIG. 8 where comparative graphs for a prior art valve (manufactured by the Griswold Company) curve 126, and a valve according to this invention, curve 128, are shown. The degree of extension of accurate flow-control utilizing this invention is strikingly evident. The 100%±3% flow rate envelope for the Griswold Company valve extends from 3.4 to 32 PSIG whereas the same flow rate envelope for my invention extends from 3.5 to 57 PSIG. The practical import of this extended range is that the inconvenience and labor cost required to replace the spring in the prior art device in order to achieve broad-range flow control such as that achieved by this invention has been overcome. Ordinarily five different controls or five different compression springs are required to accomplish what has been accomplished with a single valve and single spring, according to my invention.

While a particular embodiment of a fluid-control valve according to this invention has been shown and described, it will be apparent to those skilled in the art that various modifications may be made to the disclosed embodiment without departing from this invention and it is the intent of the appended claims to cover all such modifications as well as the disclosed embodiment.

I claim:

1. A flow-control valve for operation with differential pressures below 100 p.s.i.g., including, in combination:

a cylindrical casing having a first inside diameter;

a cylindrical regulator including side exit ports, an end wall and a flow-controlling end-exit port axially disposed in said end wall and extending axially completely through said end wall for undiverted flow of fluid along the axis of said regulator through said end-exit port, said regulator having a second outside diameter and a third inside diameter;

a piston having a fourth outside diameter which is less than said third inside diameter, said piston being in slidable engagement with said regulator and having side fluid inlet ports at the unstream end thereof and a skirt portion at the downstream end thereof, said skirt portion being adapted to engage said side ports in said regulator when said piston slides into said regulator in response to fluid pressure on side piston, said piston having a fifth inside diameter;

a spring carried within said piston and regulator and positioned to urge said piston and regulator in opposite directions, said spring having a sixth outside and a seventh inside diameter and a first free length and a second solid length;

said fifth inside diameter being approximately 0.67 times said first inside diameter;

said sixth outside diameter being approximately 0.59 times said first inside diameter;

said seventh inside diameter being approximately 0.51 times said first inside diameter;

said first free length of said spring being approximately 1.4 times said first inside diameter; and, said second solid length of said spring being approximately 0.46 times said first inside diameter.

2. Apparatus according to claim 1 in which said second outside diameter is approximately 0.74 times said first inside diameter.

3. Apparatus according to claim 1 in which said fourth outside diameter is approximately 0.71 timses said first inside diameter.

4. Apparatus according to claim 1 in which said second outside diameter is approximately 0.74 times said first inside diameter and said fourth outside diameter is approximately 0.71 times said first inside diameter.

5. Apparatus according to claim 1 in which said side exit ports and said end exit port are circular in shape and have equal diameters.

6. Apparatus according to claim 1 in which the total area of said side exit ports and said end exit port is equal to the total area of said side entry ports.

* * * * *